W. L. WAGNER.
STANCHION.
APPLICATION FILED JAN. 4, 1910. RENEWED MAR. 18, 1911.
1,005,489.
Patented Oct. 10, 1911.
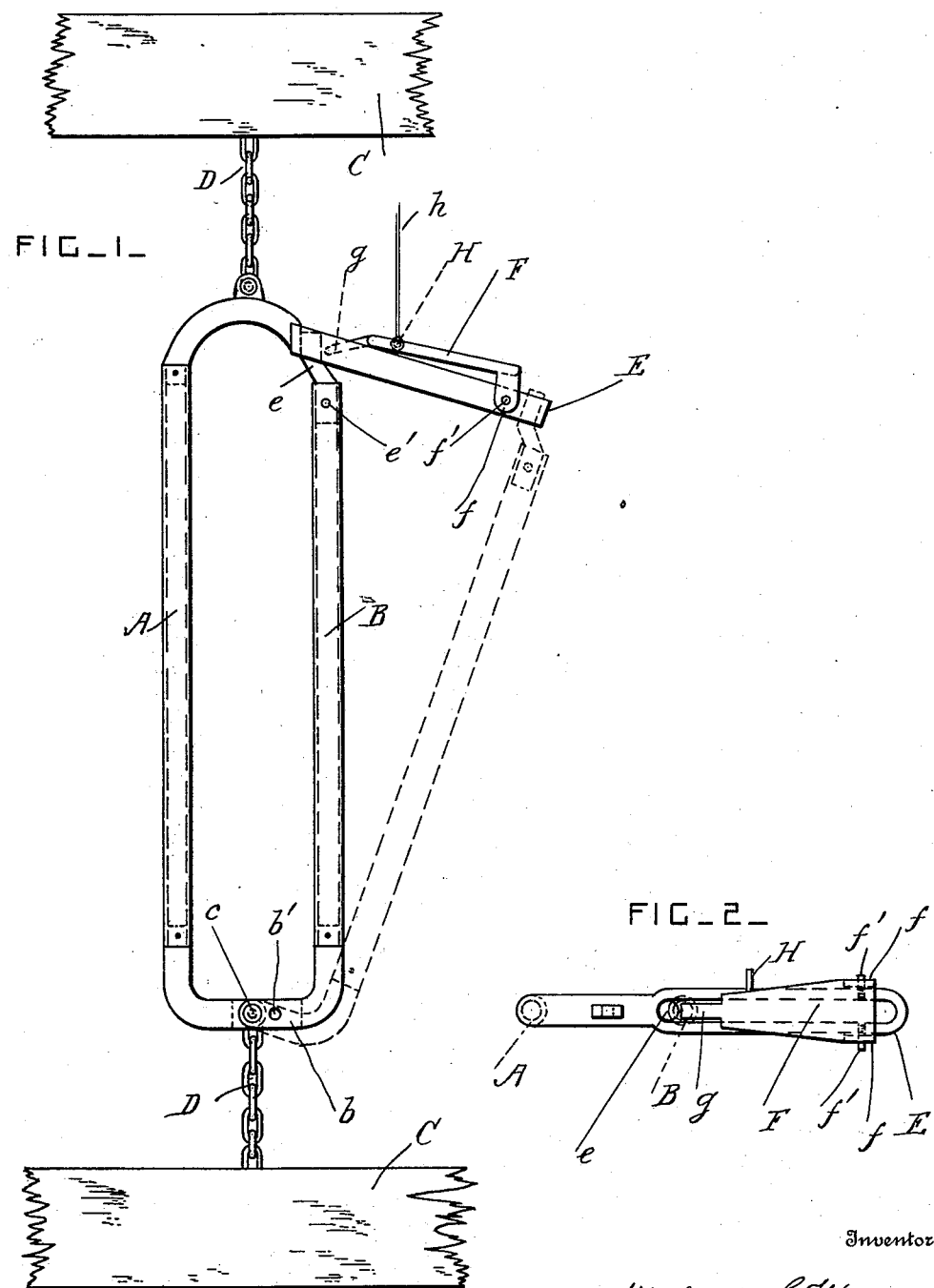

UNITED STATES PATENT OFFICE.

WILLIAM L. WAGNER, OF ANKENY, IOWA.

STANCHION.

1,005,489. Specification of Letters Patent. Patented Oct. 10, 1911.

Application filed January 4, 1910, Serial No. 536,305. Renewed March 18, 1911. Serial No. 615,385.

*To all whom it may concern:*

Be it known that I, WILLIAM L. WAGNER, a citizen of the United States, residing at Ankeny, in the county of Polk and State of Iowa, have invented certain new and useful Improvements in Stanchions; and I do hereby declare the following to be a full, clear, and exact description of the invention, such as will enable others skilled in the art to which it appertains to make and use the same.

This invention relates to stanchions for holding cattle in cow-barns; and it consists in the novel construction and combination of the parts hereinafter fully described and claimed.

In the drawings, Figure 1 is a front view of the stanchion. Fig. 2 is a plan view of the stanchion.

A is the frame or main portion of the stanchion which is open at one side. B is the closing-bar which forms the other side of the yoke. This bar B and the other side bar of the yoke are preferably tubular, for lightness. The bar B is provided with a forked portion $b$ at its lower end having a plurality of holes $b'$, and $c$ is a pivot-pin which passes through one of the holes $b'$ and through a hole in the lower part of the yoke-frame and connects the parts together.

The yoke is connected to any suitable stationary support, such as parallel bars C by flexible connections or chains D at its top and bottom, so that the yoke is supported in the cow-barn at any desired height above the ground or floor. The yokes are connected to the bars C in a row so that the cows stand side by side.

The yoke-frame A has at its upper part, and upon one side thereof, a laterally projecting guide-loop E, and the upper end portion of the closing-bar B is provided with an eccentric pin $e$ which is slidable in the loop E. The eccentric pin $e$ is secured in the upper end portion of the closing-bar B by a fastening-pin $e'$.

F is a latch having at one end lugs $f$ which straddle the guide-loop, and which are pivoted to the guide-loop by pins $f'$. The main part of the latch extends over the main part of the guide-loop, and it has a detent $g$ at its free end which enters the loop and engages with the closing-bar B.

H is an operating-pin or projection which projects laterally from one side of the latch, and $h$ is a flexible connection, such as a cord or chain, which is attached to the pin H so that the latch can be raised from a distance. When a number of stanchions are arranged in a row, the cords $h$ are all connected together and are supported in any approved manner so that the latches can all be raised at once, or each one can be raised separate from the others.

When the latch is raised on its pivot, the closing-bar turns to the position shown in dotted lines in Fig. 1, and rests against the outer end of the guide-loop. This releases the animal. When the animal is to be secured in the stanchion, the closing-bar is moved by hand from the position shown in dotted lines to the position shown in full lines. The upper end of the bar B pushes up the catch and passes under the detent, and the detent then drops back into the guide-loop and holds the closing-bar in place.

When the animal is small and has a narrow or thin neck, the closing-bar is adjusted to suit its neck, by turning around the eccentric-pin and securing it so that it projects toward the opposite side of the bar B from the position shown, and by placing the pivot-pin $c$ in engagement with the other hole in the jaw, so that the side-bars of the yoke are nearer together.

What I claim is:

1. In a stanchion, the combination, with a frame for receiving the neck of the animal provided at one side with a pivoted closing-bar, said frame having also a guide-loop at its upper part, of a reversible eccentric pin connected to the free end portion of the closing-bar and adapted to vary the width of the neck-space, and a catch having at one end lugs which straddle the guide-loop and which are pivoted to it, the other end of the said catch being arranged to enter the said loop and engage with the eccentric pin, and the main portion of the said catch being arranged to be lifted by the said eccentric pin when the frame is being closed.

2. In a stanchion, the combination, with a frame for receiving the neck of the animal and provided at one side with a pivoted closing-bar, of a reversible eccentric pin connected to the free end portion of the closing-bar and adapted to vary the width of the neck space, and a catch for holding the closing-bar in its closed position.

In testimony whereof I have affixed my signature in the presence of two witnesses.

WILLIAM L. WAGNER.

Witnesses:
W. H. HUTTON,
ALEX WILSON.

Copies of this patent may be obtained for five cents each, by addressing the "Commissioner of Patents, Washington, D. C."